United States Patent Office 3,539,443
Patented Nov. 10, 1970

3,539,443
LAMINATES OF OXIDIZED EPOXY RESINS WITH LINEAR THERMOPLASTIC POLYESTERS OR POLYAMIDES AND METHODS OF MAKING SAME
Winston J. Jackson, Jr., Kingsport, Tenn., assignor to Eastman Kodak Company, Rochester, N.Y., a corporation of New Jersey
No Drawing. Filed Oct. 10, 1968, Ser. No. 766,617
Int. Cl. B32b 27/38, 27/16
U.S. Cl. 161—186        10 Claims

ABSTRACT OF THE DISCLOSURE

Oxidation of the surface of epoxy resin imparts properties thereto which greatly improve the adherence of linear thermoplastic polyesters and polyamides. Oxidation may be carried out by heating in the presence of air, by flame treatment, by corona treatment, or by treating with chemical oxidizing agents.

---

This invention relates to laminated compositions of epoxy resins with polyesters or polyamides. In particular, it relates to polyester and polyamide hot melt adhesives and coatings for epoxy resins.

Compared to other types of adhesives, hot melt adhesives are of value because of their speed of application. No solvents must evaporate and no curing must take place, and strong adhesive bonds are obtained as soon as the adhesive cools. Polyesters and polyamides are of particular interest as potential hot melt adhesives and coating materials. Many polyesters and polyamides have low adhesive strength, particularly peel strength, on epoxy resins and substrates coated with epoxy resins.

It is an object of this invention to provide epoxy resins with improved adhesion to polyesters and polyamides. It is a further object of this invention to provide laminated compositions consisting of epoxy resins bonded or coated with polyesters and polyamides.

One particularly important aspect of this invention is the sealing of the side seams of cans. The side seams of tin plated cans normally are soldered but, to avoid the use of tin, the trend in the can industry is to use aluminum and tin-free steel, both of which are very difficult to solder. Beverage and food cans are coated, often with an epoxy resin, to prevent the can from affecting the flavor and to prevent the beverage or food from attacking the metal. A particular object of this invention, therefore, is to provide a process for sealing these epoxy-resin-coated cans.

The objects hereinafter appearing have been accomplished in accordance with the present invention through the discovery that by oxidizing the surface of an epoxy resin or epoxy-resin-coated substrate, a laminated structure with a polyester or polyamide, which serves as a coating material or as a hot melt adhesive, can be made having exceptional bond strength.

The epoxy resins useful in the present invention includes not only unmodified polyepoxides but also blends with up to 50 wt. percent of other polymeric materials, such as melamine resins, phenol-formaldehyde resins, urea-formaldehyde resins, polyamides, and epoxy esters of unsaturated fatty acids. Such epoxy resins are disclosed by C. E. Schildknecht in "Polymer Processes," Interscience Publishers, Inc., 1956, pp. 429–474, 506–509. The epoxide derivatives may be prepared by the reaction between phenolic compounds and epichlorohydrin as described on pp. 429–432. They are also described in U.S. Pats. 2,643,239, 2,694,694, 2,582,985. Glycidylamine resins derived from epichlorohydrin and amines, such as 4,4'-methylene-dianiline, may be used. Also aliphatic and cycloaliphatic epoxides, such as butadiene epoxide, vinyl cyclohexene dioxide, and dicyclopentadiene dioxide, may be used. In general, the epoxides described by Schildknecht on pp. 432–439 an those listed in U.S. Pat. 3,098,056, column 3, may be used. The polyepoxides may be cured (hardened) by heating with about 1 to 30 weight percent of a curing agent (hardener), as described by Schildknecht on pp. 439–454. Many of the commercially available epoxy resins are prepared from bisphenol A and epichlorohydrin and have the following structure wherein $n$ ranges from 0 to 20 or higher:

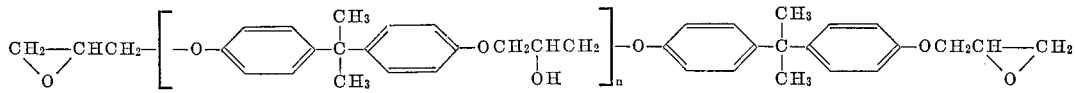

When the resins are cured, crosslinking takes place through interaction of the terminal epoxy groups, the curing agent, and some of the pendant hydroxyl groups. If another resin is also present, such as a phenol-formaldehyde resin or polyamide, the active hydrogen atoms in these resins, for example, the hydroxyl groups of the phenol-formaldehyde resin, also enter into the crosslinking reaction. See Shell Chemical Company Technical Bulletin SC:58–92 for a list of available Epon resins and their properties.

To improve the adhesion of the epoxy resin to polyesters and polyamides, the surface of the epoxy resin is oxidized. Oxidation may be carried out by heating to an elevated temperature in the presence of air, by treating with a flame, or by treating with corona. The surface also may be oxidized with ozone or with conventional chemical oxidizing agents such as nitric acid, chromic acid, or acidic dichromate solutions. Oxidation presumably involves attack on the hydroxypropyl groups in the polymer chain with the formation of keto or carboxyl groups or additional hydroxyl groups. In general, the rate of oxidation of the epoxy resin surface increases with increasing temperature and increasing intensity of treatment, that is, intensity of corona discharge or concentration of oxidizing agent. The art contains may disclosures of how to oxidize polymer surfaces. A few of such disclosures are the following U.S. patents: 3,242,002; 3,051,597; 3,352,714; 3,255,099; 3,286,009; and British Pat. 920,860.

The oxidation treatment may be applied directly to the shaped epoxy resin, or it may be applied after the epoxy resin has been used to coat another material. In all cases the epoxy resin is cured before the oxidation treatment. Substances which may be coated with an epoxy resin and then, after the oxidation treatment, coated or laminated with the polyesters or polyamides include metals, glass, ceramic materials, and organic resins. Specific examples are steel, iron, aluminum, chromium, copper, brass, bronze, nickel, zinc, titanium, tin, melamine resins, urea resins, phenolic resins, alkyl resins, cellulose esters, polyesters, polyamides, and vinyls.

The polyesters useful in the present invention as coatings or adhesives have an I.V. of at least about 0.4 and are prepared by conventional techniques, preferably by ester interchange of glycols and dialkyl esters of dicarboxylic acids. More than one glycol or acid may be used to give copolymers. The glycol may be aliphatic or alicyclic, it may contain from 2 to 20 carbon atoms, and the carbon chain may be straight or branched. Examples of such glycols are ethylene glycol, 1,2-propylene glycol, 1,4-butanediol, 1,6-hexanediol, 1,10-decanediol, 1,3-pentanediol, 2,2-dimethyl-1,3-propanediol, 1,4-cyclohexanediol, 1,3-cyclohexanedimethanol, 1,4-cyclohexanedimethanol, diethylene glycol, and triethylene glycol. The dicarboxylic acid may be aliphatic, or alicyclic, or aromatic and may contain from 2 to 20 carbon atoms. The carbon chain of the aliphatic acids may be straight or branched. Examples of such acids are malonic, dimethylmalonic, adipic, 2-methyladipic, azelaic, sebacic, terephthalic, isophthalic, hexahydroterephthalic, hexahydroisophthalic, trans-1,4 cyclohexanedicarboxylic, 2,5-norbornanedicarboxylic, and oxydipropionic.

Crystalline polyesters are preferred to amorphous polyesters because, in general, the crystalline polyesters have higher melting points and, therefore, are useful at higher temperatures. This invention is also applicable to amorphous polyesters, and the blending of a polyolefin or a vinyl polymer with either crystalline or amorphous polyesters yields hot-melt adhesives with improved flowing and wetting properties and improved processing characteristics. Surprisingly, some of the blends have better adhesion than the unblended polyesters. Also, surprisingly, the polyesters retain their high-temperature adhesive properties. It would be thought that blending a brittle, low-melting polymer, such as polystyrene, with a high-melting polyester would give a product with poorer adhesive properties. The reason for this unusual effect is unknown. It was observed, however, that for the most part, the polyolefins and vinyl polymers are incompatible with the polyesters.

More than two polymers may be blended together, e.g., two polyesters and one polyolefin, one polyester and two polyolefins, etc. The use of these blends as hot melt adhesives is disclosed in our Ser. No. 671,940. A wide variety of polyolefins may be used in these blends. The hard, rigid types such as polystyrene are useful for the production of melt adhesives that are required to retain their bond strength at relatively high temperatures. Softer types such as polyethylene and polyisobutylene are useful for improving the flow properties of the blend and also for improving the low temperature adhesive properties. Typical examples of suitable polyolefins include polystyrene, poly(alpha-methylstyrene), poly(p-chlorostyrene), polyethylene, polypropylene, polybutene-1, poly(vinylcyclohexane), poly(4-methylpentene), and poly(allylbenzene). The polymers may be of the amorphous type or they may be stereoregular types. Other olefin-type polymers which may be used are listed in U.S. 3,239,582, column 2, lines 10–47.

Copolymers of olefins are useful as represented by styrene-ethylene, styrene-butylene, styrene-butadiene, propylene-ethylene, butylene-ethylene, etc. Copolymers of olefins with other types of monomers are useful, as represented by ethylene-vinyl acetate, ethylene-methyl acrylate, ethylene-acrylic acid, styrene-acrylic acid, styrene-methyl methacrylate, styrene-acrylonitrile, and the like.

In general, any type of vinyl polymer and copolymer may be blended with the polyester, providing it is stable under the conditions used to form the adhesive bonds. These polymers are derived from polymerizable compounds containing a —CH=C< group or more especially a $CH_2$=C< group. Suitable unsaturated compounds of this latter kind include vinyl propionate, vinyl butyrate, vinyl trifluoroacetate, vinyl benzoate, etc., alkyl esters of acrylic and methacrylic acids such as methyl acrylate, ethyl acrylate, butyl acrylate, methyl methacrylate, etc., unsaturated nitriles such as acrylonitrile, methacrylonitrile, ethacrylonitrile, vinylidene cyanide, etc., vinyl hydrocarbons and derivatives such as styrene, alpha-methylstyrene, p-methyl-styrene, p-acetamino-styrene, alpha-acetoxystyrene, ethylene, isobutylene, etc., halogen unsaturates such as vinyl chloride, vinyl fluoride, vinylidene chloride, vinylidene fluoride, tetrafluoroethylene, chlorotrifluoroethylene, etc., the amides, N-alkylamides and N,N-dialkylamides of acrylic and methacrylic acids, such as acrylamide, N-methyl acrylamide, N-isopropyl acrylamide, N,N-dimethylacrylamide, methacrylamide, N-butyl methacrylamide, etc., vinyl imides, N-vinyl lactams, vinyl pyrrolidones, vinyl pyridines, the esters, amides and ester-amides of maleic, fumaric, itaconic and citraconic acids, vinyl alkyl ketones, vinyl alkyl ethers, and the like.

Blending of the polyesters with the polyolefins or vinyl polymers may be carried out by various common procedures, including mechanical mixing of the particles, blending on hot rolls, mixing in the melt, or mixing in solution and then removing the solvent. The latter method is preferred for polyesters and vinyl polymers which can be dissolved in a common solvent, such as chloroform. Films are cast and used for forming the adhesive bonds. Blending in solution is also preferred for polyesters which melt above 250° C. It is usually necessary to heat the mixture to attain solution, and chlorinated biphenyls containing from 30 to 60% chlorine are suitable for use as solvents. After solution is attained, the solvent is removed by distillation under reduced pressure, and the last traces are removed by extraction. Polyesters melting below 250° C. may be melt blended by various techniques. A satisfactory procedure is to stir the two polymers together under an inert atmosphere in a flask immersed in a metal bath.

The polyamides which are used as coatings or adhesives herein have an I.V. of at least about 0.4 and are prepared by conventional methods from amino acids, from lactams, or from diamines with dicarboxylic acids or dicarboxylic acid chlorides. The polymers may be copolyamides, or they may be poly(ester amides). Amino acids or lactams containing from 3 to 20 carbon atoms may be used to prepare the polyamides, for example, caprolactam, pivalolactam, propiolactam, aminocaproic acid, aminocaprylic acid, amino-undecanoic acid, and aminododecanoic acid. Carboxylic acids or carboxylic acid chlorides containing from 3 to 40 carbon atoms may be used, e.g., malonyl chloride, adipoyl chloride, adipic acid, 3-methyladipic acid, sebacic acid, isophthalic acid, terephthalic acid, dodecanedicarboxylic acid, and oleic acid dimer. Diamines containing from 2 to 20 carbon atoms may be used, e.g., ethylenediamine, 2,2-dimethyl-1,3-propanediamine, 2-methyl-1,5-pentanediamine, 1,6-hexanediamine, 1,12-dodecanediamine, 3,3'-oxydipropylamine, 9,9-fluorenedipropylamine, and 1,4-cyclohexane-bis(methylamine). Crystalline polyamides are preferred to amorphous polyamides because, in general, the crystalline polyamides have higher melting points and, therefore, are useful at higher temperatures.

The epoxy resin may be shaped, cured, oxidized, and then coated with the polyester or polyamide, or the epoxy resin may first be used to coat another material, as already discussed, and then be cured. The cured, oxidized epoxy resin coating may itself be coated with the the polyester or polyamide, or the polyester or polyamide may be used as a hot melt adhesive to bond the epoxy-resin-coated substrate to another surface.

It is generally advisable to clean the surfaces of the components to be laminated to remove foreign matter, grease, oxide coatings, etc., which might interfere with adhesion of the coating or adhesive. Preferably, the surface is cleaned prior to the oxidation treatment. The polyester or polyamide may be applied in molten form with a spatula or regular extrusion equipment. If the polymer is soluble in a volatile solvent, such as chloroform, it may be applied as a dope and the solvent allowed to evaporate. Or a film of the polymer (2 to 6 mils in thickness) may be placed between the surfaces to be laminated together. After application of the polymer, the surfaces are clamped together with a pressure of several pounds per square inch and heat is applied by placing the clamped structure in a forced-air oven, in a hot oil bath, or in a metal bath at a temperature about 20 to 50° C. above the softening range of the polyester. A convenient way of bonding epoxy-resin-coated metal test strips is to heat them together on a hot plate while rubbing back and forth with a wooden spatula. No additional pressure is necessary. A glue line (adhesive thickness) of 3 to 5 mils is satisfactory.

Fillers, pigments, and glass cloth may be incorporated in the adhesive layer to increase the bonding strength and temperature resistance. Fillers and pigments, such as very finely divided silica, alumina, or calcium carbonate, also affect the degree of crystallinity and the size of the crystallites. From 1 to 30% by weight may be added. Antioxidants and stabilizers also may be incorporated in the polymers to improve the thermal and oxidative stability at elevated temperatures.

The following examples further illustrate the invention.

All polyesters and polyamides are prepared by conventional procedures. Inherent viscosities (I.V.) are determined at a concentration of 0.25 g./100 ml. in 60/40 phenol/tetrachloroethane at 25° C.

Specimen Preparation—Metallic specimens 1 in. wide and 5 in. long are degreased by washing three times with a detergent solution of Alconox and rinsing in water each time. The specimens are then rinsed in acetone and dried. They are coated by dipping into a solution consisting of 10 g. of the epoxide resin or modified epoxide resin and 70 ml. of chloroform. An amine, such as 0.3 g. of diethylenetriamine, is used as a catalyst. The coating is dried in air and then cured for 1 hr. in an oven at 200° C. Epon 828 is used as an unmodified polyepoxide based upon bisphenol-A. M and T Primer XL3680, a bisphenol-A based epoxy-phenolic, is used as the coating. This material is supplied in a solvent consisting of a mixture of mixed xylenes, sec-butyl alcohol and methylethyl ketone, and the coating is cured for 10 min. at 415° F.

The epoxy resin coatings are oxidized by several methods. One procedure consists of subjecting the coating to a corona treatment. The corona discharge is produced by a Tesla type high frequency generator, adjusted for maximum output of approximately 1500 v., from Fisher Scientific Company. A 5 in. wire is attached to the pointed end of the detector and a thin (0.4 mm.) glass tube is slipped over the wire. The wire is moved up and down over the portion of the surface to be bonded of four 1-inch wide coated specimens lying on a grounded aluminum plate. No change occurs in the appearance of the coating. The tables list the adhesive values which are obtained after a 4-min. treatment. Longer treatment times give better adhesion, and shorter times can be used with a more intense corona source. A second oxidation treatment consists of heating the coated specimens for 1 min. in a chromic acid solution at 90° C. The solution is prepared by slowly adding 800 ml. of concd. sulfuric acid to 500 ml. of a saturated solution of potassium dichromate in water. After the treatment the specimens are thoroughly rinsed with water. Very little change occurs in the appearance of the coating. A third oxidation treatment consists of heating the coated specimens for 15 sec. on a hot plate with a surface temperature of 425° C. The surfaces exposed to the air, which have become brown in color, are bonded together. A fourth oxidation treatment consists of subjecting the coated surface to an intense bunsen burner flame for 10 sec. The surfaces which are exposed to the flame are bonded together. These surfaces are brown in color. These four oxidation procedures will be referred to, respectively, as the corona treatment, the chromic acid treatment, the heat treatment, and the flame treatment.

BOND FORMATION AND TESTING

The T-peel strengths are measured in accordance with ASTM D1876–61T but using the precut specimens which have been coated and treated. A specimen is heated sufficiently on a hot plate for the polyester or polyamide to melt (applied as 20-mesh particles or by rubbing a large piece back and forth). A hot plate temperature of 240–260° C. is satisfactory for most of the polyesters, but the polyamides and the higher-melting polyesters require 280° to 300° C. After the molten polymer is evenly spread on each specimen over a 2 in. length with a wooden spatula, the specimens are pressed together on the hot plate with the adhesive surfaces together. The sample is then turned over with the second side against the hot plate surface. Heating is continued while the wooden spatula is rubbed back and forth over the adhesive area until a smooth, even glue line is obtained (about 30 sec.). Then the specimen is placed on the laboratory bench and rubbing continued for about 20 sec. longer while the adhesive cools. This method of forming the adhesive bonds gives reproducible results similar to those obtained by clamping the specimens together and heating in a forced-air oven 20 to 50° C. above the polymer melting point. Glue lines are about 3 to 5 mils in thickness. The tensile shear strengths are measured in accordance with ASTM D1002–64 but using the 1-in. wide precut specimens which have been coated and treated; they are bonded as discussed above but with ¼-in. overlap.

Table 1 lists the T-peel strengths of laminates of 6.5 mil chrome-treated steel coated with the epoxy-phenolic coating, oxidized by the various methods, and then bonded with a number of miscellaneous polymers. Table 2 lists the peel strengths of these substrates bonded with a number of representative polyesters. Table 3 (peel strength) and Table 4 (tensile shear strength) lists these substrates bonded with a number of representative polyamides. Similar improvement in peel and tensile shear strength of these polyesters and polyamides is obtained when the metal substrate is aluminum, copper, titanium, or steel coated with unmodified polyepoxides (Epon 1001 or Epon 1004) or modified polyepoxides containing up to 50 wt. percent of a phenol-formaldehyde resin, urea-formaldehyde resin, or polyamide.

TABLE 1

| Example | Polymer | Polymer I.V. | Oxidation method | T-peel strength, lb./in. |
|---|---|---|---|---|
| A | Polypropylene | 1.00 | None | 0 |
|  | do | 1.00 | Corona | 0 |
| B | Polystyrene | 0.83 | None | 0.3 |
|  | do | 0.83 | Corona | 0.3 |
| C | Polyvinyl acetate | 0.80 | None | 1.4 |
|  | do | 0.80 | Corona | 1.8 |
| D | Polyvinyl butyral | 1.41 | None | 1.7 |
|  | do | 1.41 | Corona | 2.6 |
| E | Cellulose acetate butyrate | 1.76 | None | 0 |
|  | do | 1.76 | Corona | 0.5 |

TABLE 2

| Example | Polyester components | Polymer I.V. | Oxidation method | T-peel strength, lb./in. |
|---|---|---|---|---|
| 1 | Terephthalic acid and ethylene glycol. | 1.02 | None | 1.0 |
| 2 | do | 1.02 | Corona | 33 |
| 3 | do | 1.02 | Chromic acid | 29 |
| 4 | do | 1.02 | Heat | 22 |
| 5 | do | 1.02 | Flame | 16 |
| 6 | Terephthalic acid and 1,4-butanediol; 85/15 polyester/polystyrene blend. | 1.04 | None | 2.7 |
| 7 | do | 1.04 | Corona | 31 |
| 8 | do | 1.04 | Chromic acid | 34 |
| 9 | do | 1.04 | Heat | 14 |
| 10 | do | 1.04 | Flame | 16 |
| 11 | Trans-1,4-cyclohexane-dicarboxylic acid and 1,4-butanediol; 85/15 polyester/polystyrene blend. | 1.16 | None | 34 |
| 12 | do | 1.16 | Corona | 56 |
| 13 | Trans-1,4-cyclohexane-dicarboxylic acid and 67/33 1,4-butanediol/neopentyl glycol. | 0.92 | None | 34 |
| 14 | do | 0.92 | Corona | 44 |

TABLE 2—Continued

| Example | Polyester components | Polymer I.V. | Oxidation method | T-peel strength, lb./in. |
|---|---|---|---|---|
| 15 | 70/30 sebacic acid/4,4'-sulfonyl dicarboxylic acid and 1,4-butanediol. | 1.60 | None | 36 |
| 16 | do | 1.60 | Corona | 43 |
| 17 | 70/30 terephthalic acid/hexahydroterephthalic acid and 1,4-butanediol. | 1.06 | None | 8 |
| 18 | do | 1.06 | Flame | 20 |
| 19 | 50/50 terephthalic acid/isophthalic acid and 1,4-cyclohexanedimethanol. | 0.71 | None | 0.8 |
| 20 | do | 0.71 | Corona | 4.7 |
| 21 | 50/50 2,6-naphthalenedicarboxylic acid/azelaic acid and 1,4-cyclohexanedimethanol. | 0.86 | None | 20 |
| 22 | do | 0.86 | Heat | 28 |
| 23 | 70/30 isophthalic acid/hexahydroisophthalic acid and ethylene glycol. | 0.91 | None | 2.1 |
| 24 | do | 0.91 | Chromic acid | 22 |
| 25 | 4,4'-sulfonyldibenzoic acid and 1,10-decanediol. | 0.75 | None | 8 |
| 26 | do | 0.75 | Corona | 18 |
| 27 | 95/5 blend of polyester No. 19 with poly(1-butene). | 0.86 | None | 1.8 |
| 28 | do | 0.86 | Corona | 11 |
| 29 | 75/25 blend of polyester No. 19 with poly(70/30 styrene/butadiene). | 0.82 | None | 2.8 |
| 30 | do | 0.82 | Corona | 23 |
| 31 | 80/10 blend of polyester No. 23 with poly(ethyl acrylate). | 0.96 | None | 2.6 |
| 32 | do | 0.96 | Corona | 15 |
| 33 | 80/20 blend of polyester No. 25 with poly(70/30 ethylene/propylene). | 0.80 | None | 10 |
| 34 | do | 0.80 | Corona | 16 |

TABLE 3

| Example | Polyamide components | Polymer I.V. | Oxidation method | T-peel strength, lb./in. |
|---|---|---|---|---|
| 35 | Caprolactam | 1.27 | None | 4.0 |
| 36 | do | 1.27 | Corona | 37 |
| 37 | do | 1.27 | Chromic acid | 35 |
| 38 | do | 1.27 | Heat | 22 |
| 39 | do | 1.27 | Flame | 17 |
| 40 | 11-aminoundecanoic acid. | 0.94 | None | 20 |
| 41 | do | 0.94 | Corona | 31 |
| 42 | 12-aminododecanoic acid. | 1.64 | None | 38 |
| 43 | do | 1.64 | Corona | 52 |
| 44 | Adipic acid and 1,6-hexane-diamine. | 1.21 | None | 1.8 |
| 45 | do | 1.21 | Corona | 9.0 |
| 46 | Sebacic acid and 1,6-hexane-diamine. | 0.97 | None | 13 |
| 47 | do | 0.97 | Corona | 45 |
| 48 | do | 0.97 | Chromic acid | 33 |
| 49 | Sebacic acid and 1,10-decane-diamine. | 1.06 | None | 17 |
| 50 | do | 1.06 | Corona | 31 |
| 51 | Azelaic acid and 9,9-fluorenedipropylamine. | 1.07 | None | 1.1 |
| 52 | do | 1.07 | Corona | 26 |
| 53 | do | 1.07 | Heat | 19 |
| 54 | do | 1.07 | Flame | 17 |
| 55 | Terephthalic acid and 3,3'-oxydipropylamine. | 1.24 | None | 0.8 |
| 56 | do | 1.24 | Corona | 7.7 |
| 57 | do | 1.24 | Chromic Acid | 6.8 |
| 58 | 60/40 caprolactam/adipic acid plus 1,6-hexanediamine. | 0.91 | None | 3.2 |
| 59 | do | 0.91 | Corona | 17 |

When the polyesters and polyamides of Tables 2 and 3 are applied as described earlier to an epoxy-resin-coated substrate and pressed down with a wooden spatula to form a coating while the substrate is heated on the hot plate, improved adhesion is obtained when the epoxy-resin coating has first been given one of the oxidation treatments. The improvement in adhesion of the polyesters of Examples 1–10 (Table 2), for instance, can easily be determined by hand—coatings on the untreated substrates (Examples 1 and 6) are readily stripped off by hand whereas the coatings on the oxidized substrates cannot be removed in this manner.

Because of their structure, some polyesters and polyamides have low peel strength on the epoxy resin-coated substrates even after oxidation of the epoxy resin surface. The improved adhesion can be demonstrated, however, by tensile shear strength measurements, and these adhesives can be used in applications which do not require resistance to peeling. These polymers often contain ring structures, which decrease the flexibility and, therefore, peel strength of the polymers. Table 4 illustrates this concept with a number of polyamides (peel strengths are about 1–3 lb./in. width). Similar improvement in tensile shear strength is obtained with polyesters. It should be noted that almost all of the polyesters and polyamides in Tables 2 and 3 have tensile shear strengths in excess of 2000 p.s.i. on the oxidized epoxy-coated steel.

TABLE 4

| Example | Polyamide components | Polymer I.V. | Oxidation method | Tensile shear strength, p.s.i. |
|---|---|---|---|---|
| 60 | Isophthalic acid and 2-methyl-1,5-pentanediamine. | 0.67 | None | 770 |
| 61 | do | 0.67 | Corona | *>2,000 |
| 62 | do | 0.67 | Chromic acid | *>2,000 |
| 63 | do | 0.67 | Heat | *>2,000 |
| 64 | Terephthalic acid and 3,4-dimethyl-1,6-hexane-diamine. | 0.82 | None | 920 |
| 65 | do | 0.82 | Corona | *>2,000 |
| 66 | Sebacic acid and 1,4-cyclohexanebis(methylamine). | 1.60 | None | 640 |
| 67 | do | 1.60 | Corona | *>2,000 |
| 68 | do | 1.60 | Chromic acid | *>2,000 |
| 69 | Azelaic acid and 4,4'-methylene-dianiline. | 0.74 | None | 800 |
| 70 | do | 0.74 | Corona | *>2,000 |

* Metal broke instead of adhesive bond.

Example 71

Aluminum strips 12 mils in thickness are coated with Epon 828 as described under "Specimen Preparation" at the beginning of this section. Diethylenetriamine is used as the catalyst, and the coating is cured for 1 hr. in an oven at 200° C. The coating surface is oxidized by the corona method, and the strips are bonded to 6.5 mil chrome-plated steel strips with each of the following polymers:

(a) Polyester of terephthalic acid and ethylene glycol, I.V. 1.02.
(b) Polyester of terephthalic acid and 1,4-butanediol, blended with 15 wt. percent of polystyrene, I.V. 1.04.
(c) Polyester of 50/50 terephthalic acid/isophthalic acid and 1,4-cyclohexanedimethanol, I.V. 0.71.
(d) Polyamide of adipic acid and 1,6-hexanediamine, I.V. 1.21.
(e) Polyamide of terephthalic acid and 3,3'-oxydipropylamine, I.V. 1.24.

The adhesive bonds show improved adhesion to the epoxy resin surface compared to similar bonds prepared without prior oxidation of the epoxy resin surface.

Example 72

When Example 71 is repeated with the epoxy-resin-coated aluminum bonded to kraft paper instead of chrome-plated steel, the bonds show improved adhesion to the epoxy resin surface compared to similar adhesive bonds prepared without prior oxidation of the surface.

This invention has been described in detail with particular reference to specific embodiments thereof, and it will be understood that variations and modification can be effected within the spirit and scope of the invention as described hereinabove and as defined in the appended claims.

I claim:
1. The process for adhering linear, thermoplastic polyesters or polyamides to solid epoxy resins comprising oxidizing the surface of the epoxy resin, and thereafter coat- ing said surface with molten polyester or polyamide component.

2. The process of claim 1 wherein the polyester component is polyethylene terephthalate.

3. The process of claim 1 wherein the polyester component is a blend of 80–90 percent by weight of a polyester of terephthalic acid and 1,4-butane diol, and 20–10 percent by weight of polystyrene.

4. The process of claim 1 wherein the polyamide component is selected from the group consisting of polyamides derived from caprolactam, 11-aminoundecanoic acid, 12-aminododecanoic acid, adipic acid and 1,6-hexanediamine, and sebacic acid and 1,6-hexanediamine.

5. The process for adhering an epoxy resin surface to another surface, comprising oxidizing the surface of the epoxy resin, applying a molten, linear, thermoplastic polyester or polyamide component thereto, and contacting said molten polyester or polyamide component with another surface.

6. The process of claim 5 wherein the polyester component is polyethylene terephthalate.

7. The process of claim 5 wherein the polyester component is a blend of 80–90 percent by weight of a polyester of terephthalic acid and 1,4-butane diol, and 20–10 percent by weight of polystyrene.

8. The process of claim 5 wherein the polyamide component is selected from the group consisting of polyamides derived from caprolactam, 11-aminoundecanoic acid, 12-aminododecanoic acid, adipic acid and 1,6-hexanediamine, and sebacic acid and 1,6-hexanediamine.

9. The process of claim 5 wherein said other surface is oxidized epoxy resin.

10. An article of manufacture comprising two or more oxidized epoxy resin coated metal surfaces adhered together with a linear, thermoplastic polyester or polyamide component.

References Cited

UNITED STATES PATENTS

| | | | |
|---|---|---|---|
| 3,051,597 | 8/1962 | Bushong et al. | 161—184 |
| 3,153,684 | 10/1964 | Bryan et al. | 117—46 X |
| 3,282,722 | 11/1966 | Hailstone | 117—46 X |
| 3,284,375 | 11/1966 | Shokal | 161—184 X |
| 3,419,452 | 12/1968 | Krysiak | 161—184 X |
| 3,436,288 | 4/1969 | Patterson | 161—184 X |
| 3,449,280 | 6/1969 | Frigstad | 161—184 X |
| 3,475,194 | 10/1969 | Samour | 117—47 |
| 3,496,250 | 2/1970 | Czerwinski | 161—184 X |
| 3,487,124 | 12/1969 | Yeshin | 161—184 X |

HAROLD ANSHER, Primary Examiner

U.S. Cl. X.R.

117—46, 47; 156—3, 82, 272, 278; 161—227, 231, 412